April 9, 1957 H. M. EATON, JR 2,788,434
WELDING STUD ASSEMBLY
Filed Jan. 29, 1954
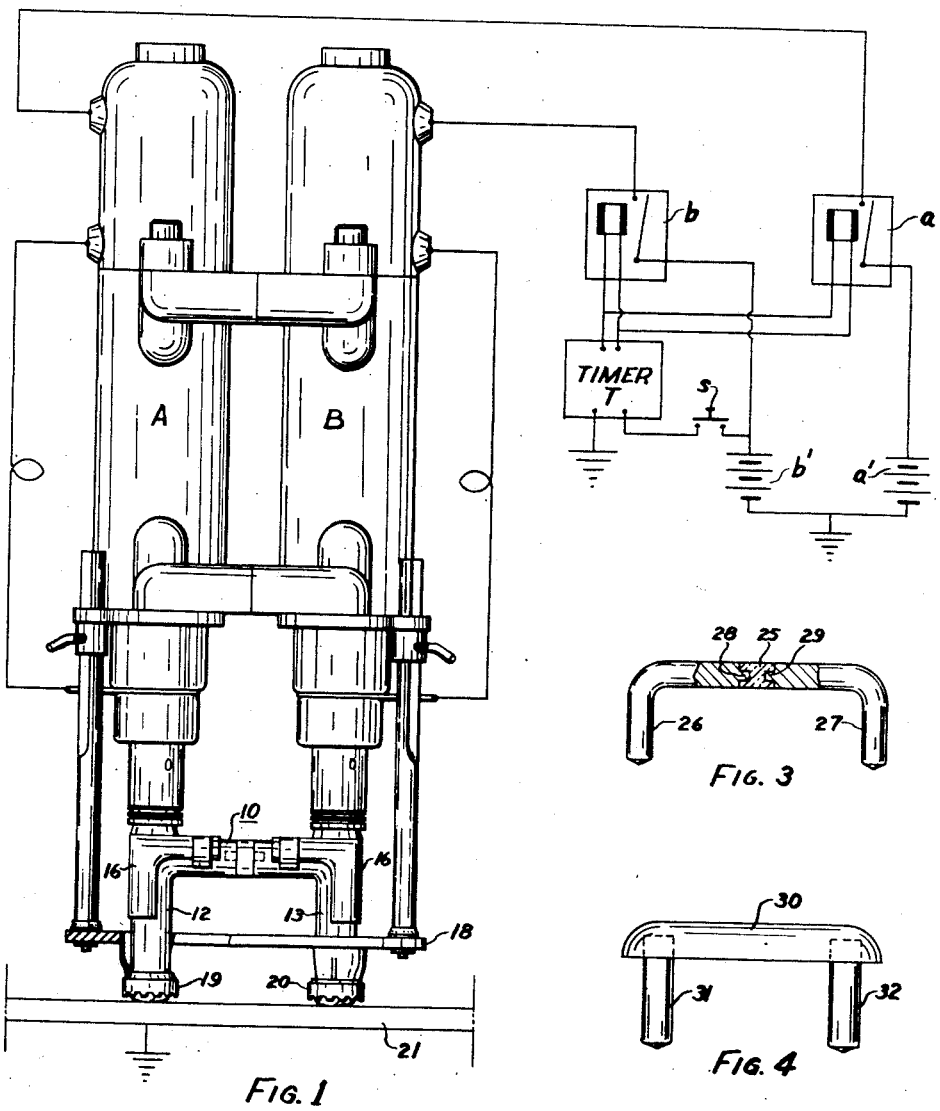
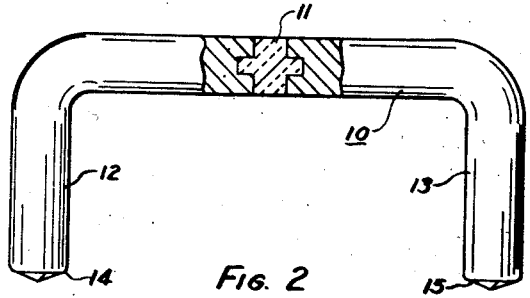
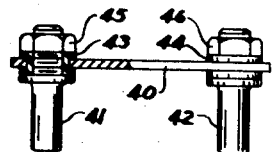
INVENTOR.
Hugh M. Eaton Jr
BY Clyde H. Haynes
his atty

United States Patent Office 2,788,434
Patented Apr. 9, 1957

2,788,434
WELDING STUD ASSEMBLY

Hugh M. Eaton, Jr., Elyria, Ohio, assignor to Gregory Industries, Inc., Detroit, Mich., a corporation of Michigan Application January 29, 1954, Serial No. 407,118

7 Claims. (Cl. 219—99)

The present invention relates to welding stud assemblies and in particular to those having two or more weldable members which are to be end arc welded to a common work piece.

Studs and stud welding guns for welding one member at a time to a work piece have been on the market for some time. However, the basic problem arose in trying to end arc weld two or more metal members which were connected together. A simple example is the common U-bolt, wherein attempts have been made to end arc weld both ends of the U-bolt to a common work piece. The difficulty arose in trying to establish identical arcs at the opposite ends of the U-bolt since welding current takes the path of least resistance. It was found that many times one of the arcs would be larger than the other arc or that one of the arcs would completely fail, thus providing a weld at only one end of the U-bolt.

This problem has been solved by designing the present stud assembly in which the members or opposite ends of the U-shaped stud assembly to be welded to the work piece are mechanically fastened together by a body and electrically insulated from each other. A welding apparatus including a stud welding gun is used to connect each member to its respective source of welding current to weld the members to the work piece. A welding current control for each member is connected between its respective member and source of welding current. However, the current controls are interlocked so that they operate simultaneously, thus all of the members of the stud assembly are simultaneously welded to the work piece.

One of the objects of the present invention is to provide a stud welding assembly having weldable metal members insulated from each other and adapted to be simultaneously end arc welded to a work piece.

Another object of the invention is to provide a method of end arc welding several studs or weldable members simultaneously to a work piece where the studs are fastened together by an electrical insulation material.

A further object of the invention is to provide a stud assembly having at least two bent studs secured together by an insulation material with each stud having a welding end adapted to be end arc welded to a work piece.

Other objects and a further understanding of the invention will become apparent from the following description and claims when taken into conjunction with the attached drawing in which:

Figure 1 illustrates stud welding apparatus used in welding the stud assembly to a work piece;

Figure 2 is an enlarged view, partially in cross section of the preferred design of the stud assembly;

Figure 3 is a view partly in cross section of a modification of the stud assembly;

Figure 4 is a view of another modification of the stud assembly;

Figure 5 is a view partly in cross section of a still further modification of the invention.

A stud welding apparatus is illustrated in Figure 1 as holding a stud assembly in position just prior to welding a stud assembly to the work piece. The stud welding apparatus in this instance comprises guns A and B which are similar to the stud welding gun illustrated in Patent No. 2,413,189, issued to Ted Nelson on December 24, 1946. Gun A is electrically connected through contactor $a$ to a source of welding current $a'$ and gun B is electrically connected through a contactor $b$ to a source of welding current $b'$. The guns A and B are mechanically fastened together into an assembled unit and are operated simultaneously by closing and opening the contactors $a$ and $b$ simultaneously. These contactors $a$ and $b$ which control the welding current for their respective guns are simultaneously operated by a common timer T which is connected through a trigger switch S to one of the sources of welding current.

In Figure 1 the stud welding guns A and B are illustrated as holding the U-shaped stud assembly 10 such as that as illustrated in Figure 2. The stud assembly illustrated in Figure 2 comprises a body of electrical insulation 11 and weldable metal members 12 and 13 carried by the insulation body 11 at a spaced distance from each other. In this instance the metal members 12 and 13 are L-shaped with one leg of the L secured to the electrical insulation 11 and with the other leg of the L terminating in a welding end. The welding end of member 12 is referred to by reference character 14 and the welding end of 13 is referred to by reference character 15. These welding ends 14 and 15 may be constructed to contain flux as illustrated in Nelson Patent No. Re. 22,411, issued December 24, 1943, or as illustrated in Patent No. 2,612,394, issued September 30, 1952.

Again referring to Figure 1 gun A has a chuck 16 for engaging and electrically conducting welding current to member 12 and gun B has a chuck 16 to engage and conducting welding current to member 13. A foot assembly 18 secured to the guns A and B holds welding ferrules 19 and 20 at the respective welding ends of the members 12 and 13 of stud assembly 10.

After the stud assembly 10 has been inserted in the chucks of guns A and B and the ferrules inserted in the foot assembly 18, the welding ends and the ferrules are pressed against the work piece 21. With the stud welding apparatus and the stud assembly now in welding position, the operator closes the trigger switch S to start the timer. The timer simultaneously closes contactors $a$ and $b$ causing at least one of the guns A and B to lift the stud assembly 10 and the individual welding ends 14 and 15 thereof away from work piece 21 to strike an arc between the welding end of each metal member and the work piece 21. The timer T keeps the contactors $a$ and $b$ closed until the arcs have sufficiently melted their respective welding ends. At the end of this time the timer T allows the contactors $a$ and $b$ to simultaneously open, thus allowing the guns A and B to simultaneously plunge the stud assembly 10 towards the work piece to cause the individual metal members thereof to be welded to the work piece 21.

Each of the metal members in the stud assembly is connected through its respective contactor to its respective source of welding current. Although Figure 1 illustrates the use of more than one welding gun for simultaneously welding the metal members, it is possible to weld the metal members simultaneously with one welding gun. In such cases the single welding gun must carry a chuck which engages one of the metal members of the stud assembly. The other metal members may then be connected directly to their respective contactors by any suitable electrical connection means. The one welding gun lifts the stud assembly from the work piece to strike the arcs between all of the metal members and the work piece.

A modification of the stud assembly, as illustrated in Figure 3, is similar to that of Figure 2, however, in Figure 3 the body of electrical insulation material 25 has a recess in each end to receive projection portions of the metal members 26 and 27. The respective projection portions 28 and 29 may be secured in the electrical insulation by any suitable means such as press fit or by molding the insulation on to the projections. Figure 3 illustrates this fastening of the metal members to the insulation in reverse to that illustrated in Figure 2 wherein the insulation 11 has projections extending into recess as in the ends of the metal members 12 and 13 respectively.

Figure 4 illustrates another modification of the invention wherein an electrical insulation body 30 supports straight studs 31 and 32. In this case the studs 31 and 32 are in parallel alignment and spaced from each other with their free ends adapted for end arc welding to a common work piece. Such an assembly may be artistically designed for use as drawer pulls, handles, etc., with the body 30 being constructed of a dielectric plastic material. The stud assembly illustrated in Figure 4 is welded to the work piece in the same manner as illustrated in Figure 1 with the exception that the chucks on the stud welding assembly would have to be modified so that they carry current to the studs 31 and 32.

In the stud assembly illustrated in Figure 5 the body 40 which mechanically supports studs 41 and 42 is metal and has insulation members 43 and 44 which insulate the body from the studs so that the studs are electrically isolated from each other. This design permits mechanical nut and bolt-like assembly of the studs and body by putting nuts 45 and 46 on the threaded ends of the studs which extend through the body. Such an assembly is very practical in holding electrical wireways in shipbuilding and construction. With this design the body or bar 40 is removable after it serves as a template to insure correct spacing of the studs during welding. Wires are then placed between the studs and the bar 40 replaced to hold the wires. As in the other designs the welding ends of the studs may be suitably fluxed and fixtures adapted to correctly connect the individual welding ends to proper welding current sources.

Each of the figures in the drawings represents a stud assembly having two welding ends which are simultaneously end arc welded to a common work piece. It is understood that more weldable members may be connected together by a body which electrically isolates the studs without departing from the spirit or scope of the invention. However, each time a weldable member is added to the stud assembly, another power source and contactor must be added for that member. The common timer for all of the connectors, whether there are two or more, will operate the contactors and the gun or guns to simultaneously end weld all of the metal members or studs of the stud assembly simultaneously to the work piece 21.

Although preferred designs of the invention have been described, it is understood that the meaning of the terms and the embodiments of the invention cover slight modifications which may be made without departing from the spirit and scope of the invention as defined in the following claims.

I claim:
1. A stud assembly for welding comprising, a body, at least two weldable metal members mechanically secured to and carried by said body at a spaced distance from each other, said body including electrical insulation means electrically isolating said members from each other, each of said members having a welding end adapted to be end arc welded to a common work piece, and means preventing movement of one weldable member relative to another weldable member.

2. A stud assembly for welding comprising, a pair of bent studs, each having a first leg and a welding leg, electrical insulation means fastened to said first legs and holding said welding legs in parallel spaced alignment.

3. The structure of claim 2 wherein said insulation means and said first legs have inter-engageable cooperating portions permanently securing each leg to the insulation means.

4. The structure of claim 3 including welding flux at the welding end of each welding leg.

5. A stud assembly for welding comprising, a supporting body, at least two electrical insulation members on said body at spaced distances from each other, and a weldable metal member fastened to each insulation member and having a weldable end, and a means preventing movement of one weldable member relative to another weldable member.

6. A welding assembly comprising, a plurality of studs having welding ends adapted to be welded to a common work piece, and supporting body means carrying said studs and preventing movement of one stud relative to another stud, said supporting body means being constructed of an electrical insulation material.

7. A welding assembly comprising, a plurality of studs having welding ends adapted to be welded to a common work piece, and supporting body means carrying said studs and preventing movement of one stud relative to another stud, said body means including electrical insulation electrically isolating one stud from another stud.

References Cited in the file of this patent

UNITED STATES PATENTS

| | | |
|---|---|---|
| 2,018,263 | Ito | Oct. 22, 1935 |
| 2,096,495 | Hogg | Oct. 19, 1937 |
| 2,154,654 | Armentraut et al. | Apr. 18, 1939 |
| 2,242,867 | Martin | May 20, 1941 |
| 2,402,256 | Nelson | June 18, 1946 |
| 2,402,659 | Nelson | June 25, 1946 |
| 2,413,189 | Nelson | Dec. 24, 1946 |
| 2,455,244 | Evans | Nov. 30, 1948 |

FOREIGN PATENTS

| | | |
|---|---|---|
| 871,795 | France | June 22, 1942 |